United States Patent [19]
McDonald

[11] 3,826,087
[45] July 30, 1974

[54] GAS ROCKET SYSTEM

[75] Inventor: Allan J. McDonald, Brigham City, Utah

[73] Assignee: Thiokol Chemical Corporation, Bristol, Pa.

[22] Filed: Nov. 11, 1971

[21] Appl. No.: 197,708

[52] U.S. Cl............. 60/200, 60/225, 60/253, 60/39.47
[51] Int. Cl. .................................................. F02k
[58] Field of Search .......... 60/225, 253, 254, 39.47

[56] References Cited
UNITED STATES PATENTS

| | | | |
|---|---|---|---|
| 3,058,304 | 10/1962 | Corbett | 239/265.35 |
| 3,159,104 | 12/1964 | Hodgson | 60/251 |
| 3,256,688 | 6/1966 | Hill | 60/253 |
| 3,446,023 | 5/1969 | Mosler | 60/257 |
| 3,460,348 | 8/1969 | Proell | 60/219 |
| 3,635,030 | 1/1972 | Schubert et al | 60/39.47 |

*Primary Examiner*—Samuel Feinberg
*Attorney, Agent, or Firm*—Edward E. McCullough

[57] ABSTRACT

In the invention, a fuel gas generator has an orificed pressure vessel, an igniter, and a solid propellant that produces fuel-rich gas on combustion; an oxidizer gas generator has an orificed pressure vessel, an igniter, and a solid propellant that produces oxidizer-rich gas on combustion; a reaction motor is connected to each gas generator by duct means, with valves in the ducts to meter and proportion the gases as desired into the reaction motor where they are burned for thrust. Gases from the gas generator are relatively cool and can be ducted through conventional valves and other devices to reaction motors for attitude and roll control, as well as for thrust of the vehicle.

2 Claims, 1 Drawing Figure

PATENTED JUL 30 1974     3,826,087
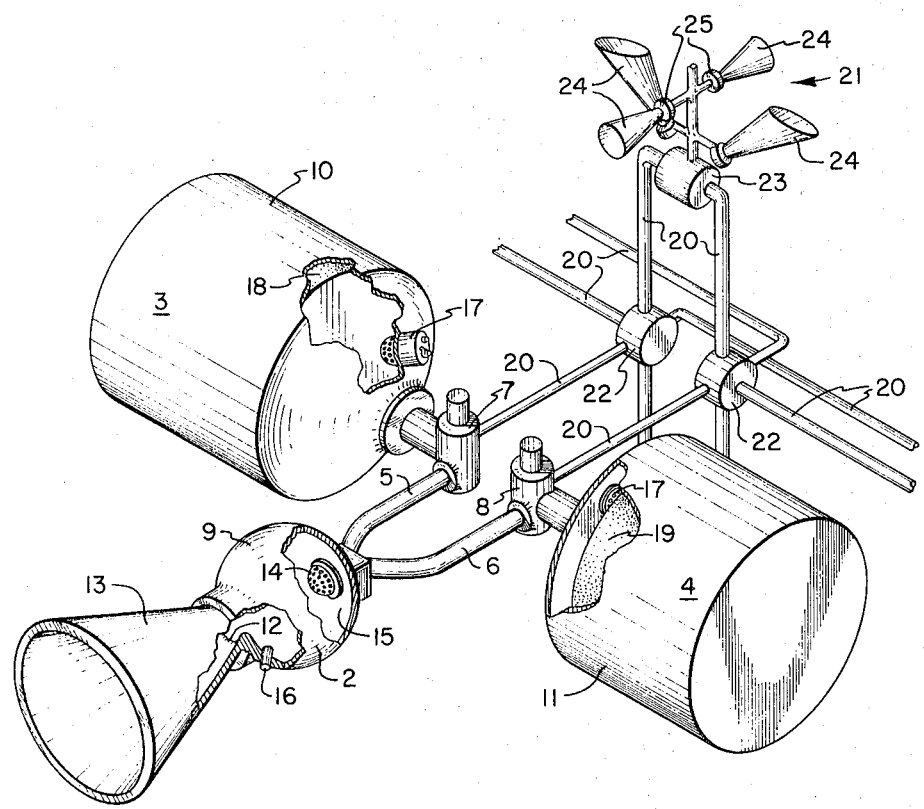
INVENTOR.
Allan J. McDonald
BY
Edward E. McCullough
AGENT

GAS ROCKET SYSTEM

BACKGROUND OF THE INVENTION

This invention relates to solid propellant rockets and particularly to a new kind of solid propellant rocket in which gas generators produce gases that may be burned in reaction motors. The invention herein described was made in the course of or under a contract with the U.S. Air Force.

Solid propellant rockets have certain well known advantages over liquid rockets in being relatively uncomplicated and instantly available for operation. On the other hand, the controllability and responsiveness of liquid rockets have been difficult to achieve with solid propellants. Start and stop rocket motors have been particularly difficult to develope using solid propellants. Attempts to do this have involved the use of pressure sensitive propellants and special, high temperature valve means.

SUMMARY OF THE INVENTION

The present invention, which overcomes these difficulties in the prior art, is a new type of rocket which generates gases that subsequently become the fuel and oxidizer to be burned in reaction motors.

In the invention, a fuel gas generator has an orificed pressure vessel, an igniter, and a solid propellant which when burned produces a fuel rich gas. An oxidizer gas generator, similar in construction, has an orificed pressure vessel, an igniter, and a solid propellant which when burned produces an oxidizer rich gas. At least one reaction motor, having a spherical pressure vessel, orificed at a thrust nozzle, is ducted and valved to each gas generator so that gases from each may be metered into the reaction motor in the quantity and proportion desired. The gases usually ignite hypergolically in the reaction motor to produce highly controllable thrust. An igniter may be included when the gases used are not hypergolic. These gases produced by the gas generators may be relatively cool and without metallic content, so that they may be controlled easily with conventional valve means and through ordinary pipes. A plurality of reaction motors may be used, e.g., one for propelling the rocket vehicle, and others for controlling attitude, roll, and direction thereof.

This new rocket motor has a number of advantages over those of the prior art: (1) such a rocket vehicle lends itself to complete controllability and very rapid response; (2) the propellant may be completely used, since the same gases may be used for both propulsion and control of the vehicle; (3) gases produced by the gas generators are cool enough to be handled by conventional equipment, so that the rocket may be completely controllable without exotic valve means; (4) the gas rocket provides considerable packaging flexibility, since the gas generators may be arranged in many ways, or even pluralized, without affecting propulsion capability; and (5) the combustion chamber is small and remains constant in size throughout the mission, promoting high predictability, rapid response, and constant rate of propellant usage for a given amount of thrust.

These advantages of the invention are accordingly its objects. An important feature of the invention is that, since the highly energetic ingredients of the propellant grains are separated in different gas generators until their use in actual operation of the rocket, the propellant grains are much less subject to accidental ignition by shock, abrasion, high temperature, or autoignition than are conventional rock propellants. Hence, handling and storage of this rocket vehicle is facilitated and less hazardous than solid propellant rockets of the prior art.

Other objects and advantages of the invention will become apparent as the following detailed description is read with reference to the accompanying drawing.

DESCRIPTION OF THE DRAWING

The FIGURE is a schematic, three-dimensional view showing relationships of the essential components of the invention.

DESCRIPTION OF THE PREFERRED EMBODIMENTS

In reference to the drawing, the vehicle of the invention essentially comprises a main reaction motor 2 used for propulsion of the vehicle, a fuel gas generator 3, and an oxidizer gas generator 4, each connected to the motor 2 by duct means in the form of pipes 5 and 6, respectively. Identical valve means 7 and 8 in the pipes 5 and 6 are responsive to electrical signals and are capable of metering gases from the gas generators into the motor 2 in the desired quantities and proportions.

Cases 9, 10 and 11 for the motor 2 and the gas generators 3 and 4, respectively, are all made according to well-known rocket case technology and are preferably made of wrapped fiber glass impregnated with a resin such as an epoxy or polyester. The case 9 of the reaction motor 2 is preferably spherical in form and is insulated with conventional materials such as nitrile butadiene rubbers to withstand high temperatures and pressures. The motor 2 has a throat orifice 12, which is a part of a De Laval nozzle 13. The pipes 5 and 6 terminate in a combination mixer, diffuser, and flame holder apparatus 14 for mixing the fuel and oxidizer gases thoroughly and for introducing them into the combustion chamber 15 defined by the motor case 9. A repeating igniter 16, which may be of an electrical arc or bridge wire type, may be used to ignite gases in the chamber 15. However, such an igniter is usually unnecessary because the gases are usually hypergolic and are spontaneously ignitable. The cases 10 and 11 for the fuel and oxidizer gas generators are preferably cylindrical in form to facilitate packaging and to maintain a constant burning surface area on the propellant grain of each. Each gas generator is equipped with an igniter 17 of some well known type that directs flaming gases onto the surface of the propellant grain.

The propellant for the fuel gas generator 3 is such that when burned, it produces gases that are fuel rich and may be burned subsequently as a fuel in the reaction motor 2. A typical propellant that may be used for this purpose has the following approximate composition by weight:

| | |
|---|---|
| hydrocarbon binder (e.g., carboxyl-terminated polybutadiene polymer containing about 8% epoxy curing agent) | 23% |
| ammonium perchlorate (finely divided) | 56% |
| dihydroxyglyoxime | 21% |

The ingredients are thoroughly mixed in vacuum, cast in the gas generator case, and cured at about 173° F for about 24 hours.

The propellant 19 in the oxidizer gas generator 4 is such that when burned it produces an oxidizer rich gas that subsequently may be used as the oxidizer for combustion in the main reaction motor 2. Such a propellant is composed of the following ingredients in percentages by weight:

perfluoroether fluorocarbon polymer (containing 9.99 percent lysine diisocyanate and 1.46 percent fluorocarbon

| | |
|---|---|
| amide triol curing system) | 16% |
| ammonium perchlorate (finely divided) | 84% |

This propellant was made and cast in the gas generator case in the same manner as was described for the fuel gas geerator.

In addition to being ducted to a main propulsion reaction motor, gases from the gas generators 3 and 4 may also be ducted through pipes 20 to various other reaction motors 21 that may be used to control attitude, roll, or direction of the rocket vehicle. Connectors, such as those indicated at 22 may be used to minimize the piping required.

It will be noted that in the present invention it is easy to use a common combustion chamber 23 to provide thrust gases for a plurality of thrust nozzles 24, each of these thrust nozzles having its own valve means 25. This system further minimizes piping that would otherwise be necessary; but, if desired, each thrust nozzle 24 may have its own combustion chamber for an independent source of thrust.

In actual practice, the system shown in the FIGURE and described in the foregoing specification is arranged to fit into a cylindrical housing for use as a rocket or a stage of a rocket. Such packaging has been neglected herein, since it is well known in the art and not considered to be a part of the present invention.

An invention has been described that constitutes an advance in the art of rocket technology by providing a gas rocket, that has solid propellant as the source of gases. Although the embodiment has been described with considerable specificity in regard to detail, it should be noted that many such details may be altered without departing from the scope of the invention as it is defined in the following claims.

The invention claimed is:

1. A rocket system comprising:
a fuel gas generator comprising an orificed pressure vessel; solid propellant in the pressure vessel that produces fuel-rich gas on combustion and comprises a cured mixture, in approximate percentages by weight, of a hydrocarbon binder (23 percent), ammonium perchlorate (56 percent), and dihydroxyglyoxime (21 percent); and an igniter in the pressure vessel for igniting the propellant;
an oxidizer gas generator comprising an orificed pressure vessel; a solid propellant in the vessel that produces oxidizing gas on combustion; and an igniter in the pressure vessel for igniting the propellant; and
at least one reaction motor comprising an orificed pressure vessel defining a combustion chamber; a thrust nozzle at the orifice; and ignition means in the pressure vessel for igniting gases therein;
duct means connecting the interior of the reaction motor with that of each gas generator; and
valve means in the duct means for metering gases from each gas generator into the reaction motor in the quantity and proportion desired.

2. The rocket system of claim 1 wherein the propellant for the oxidizer gas generator comprises a cured mixture, in approximate percentages by weight:

| | |
|---|---|
| polyfluoroether fluorocarbon binder | 16% |
| ammonium perchlorate | 84%. |

\* \* \* \* \*